May 2, 1939.　　　　C. S. HAZARD　　　　2,156,812
TEMPERATURE COMPENSATOR FOR METER DRIVEN REGISTERS
Filed Dec. 1, 1936　　　　3 Sheets-Sheet 1

INVENTOR
Charles S. Hazard
BY
August, Meany & Campbell
ATTORNEYS

May 2, 1939.  C. S. HAZARD  2,156,812
TEMPERATURE COMPENSATOR FOR METER DRIVEN REGISTERS
Filed Dec. 1, 1936  3 Sheets-Sheet 2
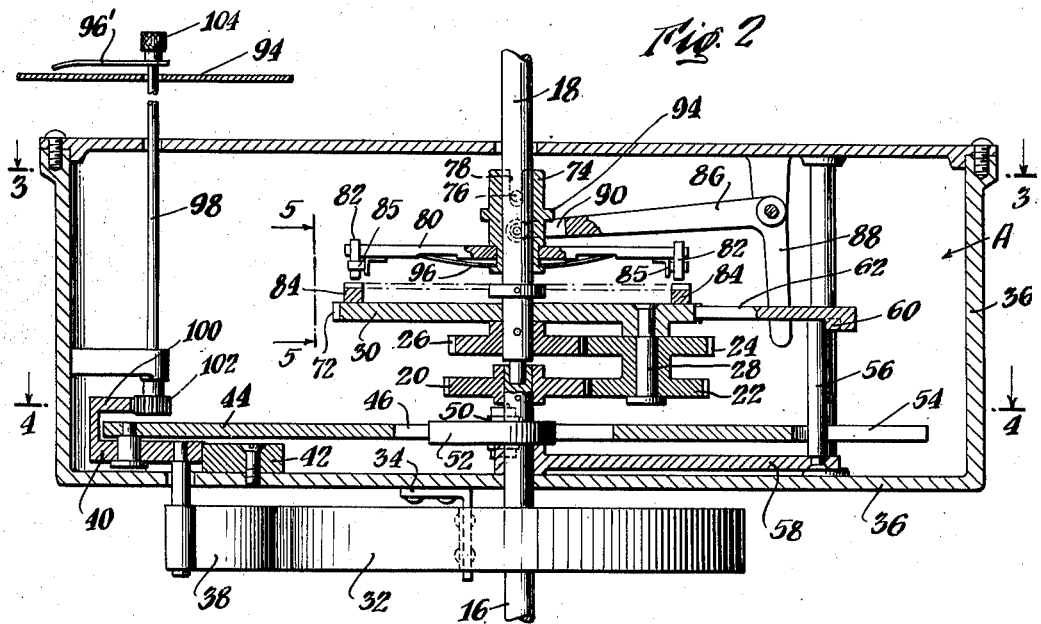
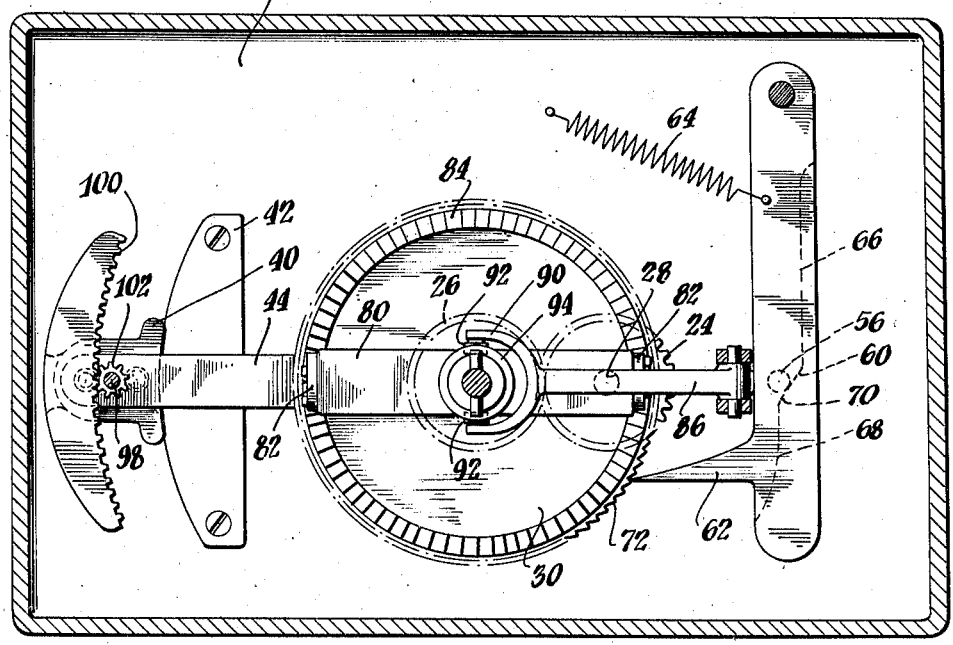
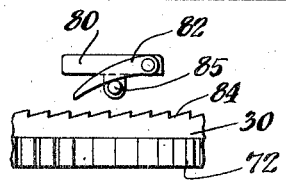
INVENTOR
Charles S. Hazard
BY
Hoguet, Neary & Campbell
ATTORNEYS Patented May 2, 1939

2,156,812

UNITED STATES PATENT OFFICE 2,156,812

TEMPERATURE COMPENSATOR FOR METER DRIVEN REGISTERS

Charles S. Hazard, New York, N. Y., assignor to Neptune Meter Company, a corporation of New Jersey Application December 1, 1936, Serial No. 113,549

7 Claims. (Cl. 73—233)

This invention relates to devices for measuring the volume of a liquid and particularly to devices operable within any normal range of temperatures for indicating the volume of the liquid at a desired predetermined temperature.

Liquids are customarily measured by suitable means such as meters without reference to the temperature at which the liquid is received or delivered. This procedure does not take into consideration increases in temperature which increase the volume of the liquid and decreases in temperature which decrease the volume of liquid. However, temperature changes may result in an increase or decrease of several hundred gallons in volume of a carload of liquid whereas the actual amount or weight of liquid may remain unchanged. Whilst this is objectionable because of the inaccuracies introduced by temperature changes, no satisfactory means has been provided heretofore to overcome this difficulty.

The most satisfactory method used is to measure the volume of liquid at a fixed or predetermined temperature, but this procedure cannot be followed when large volumes are to be measured because of difficulties encountered in bringing the entire body of liquid to the desired temperature. Therefore, in order to determine the exact quantity of liquid at the fixed temperature, it has been necessary to measure the volume, determine the average temperature and then apply a temperature correction factor to the measured volume. Such correction factors are, at best, only approximations for any given type of liquid because of the fact that in a large volume of liquid there may be zones of varying temperature, and as a consequence, one portion of the liquid may be more expanded or contracted than another portion of the liquid.

An additional disadvantage resulting from the application of a correction factor to a given volume of liquid at a measured temperature resides in the fact that an inexperienced workman may quite readily apply the wrong correction factor or may apply it opposite to the manner in which it is intended to be applied, and consequently, an incorrect adjustment or even a doubling of the error in increased or decreased volume may result.

The present invention has as an object, the provision of means for automatically, and as an incident to the measuring of the volume of a liquid, indicating the volume of the liquid as corrected to the desired predetermined temperature.

A further object of the invention resides in the provision of measuring and indicating devices which are thermally responsive to the temperature of the liquid passing therethrough, thereby overcoming any error which might occur through variations in temperature in the body of liquid being measured.

The objects of the invention may be achieved by interposing a thermally responsive variable speed transmission device between a measuring device and an indicating device, a thermally responsive element of the device being in intimate contact with the liquid passing through the measuring device.

More specifically, the invention suitably may consist of a system of planetary gearing characterized by the ability to either transmit the motion of operation of the measuring device directly to the register when no restraining action is placed upon the planetary gearing system, or to vary the speed of the register with respect to the measuring device when restraint is placed upon the planetary gear system.

Thermostatically controlled means are provided for intermittently placing restraint upon certain elements of the planetary gearing system so that the motion of operation of the measuring device is transmitted through the planetary gearing system with a consequent increase or decrease in relative speed of the registering or indicating device.

Still more specifically, the restraining element or the element for restraining the operation of certain elements of the planetary gearing is so arranged and controlled that it intermittently restrains and releases the planetary gearing system proportionally to the temperature of the liquid passing through the measuring device.

For a better understanding of the invention, reference may be had to the accompanying drawings in which:

Figure 2 is an enlarged view partly in section of a typical embodiment of the temperature compensating transmission of Figure 1;

Figure 3 is a view in section taken on the line 3—3 of Figure 2;

Figure 5 is a fragmentary view of a detail of the transmission taken in the direction of the arrows 5—5 of Figure 2;

Figure 1:
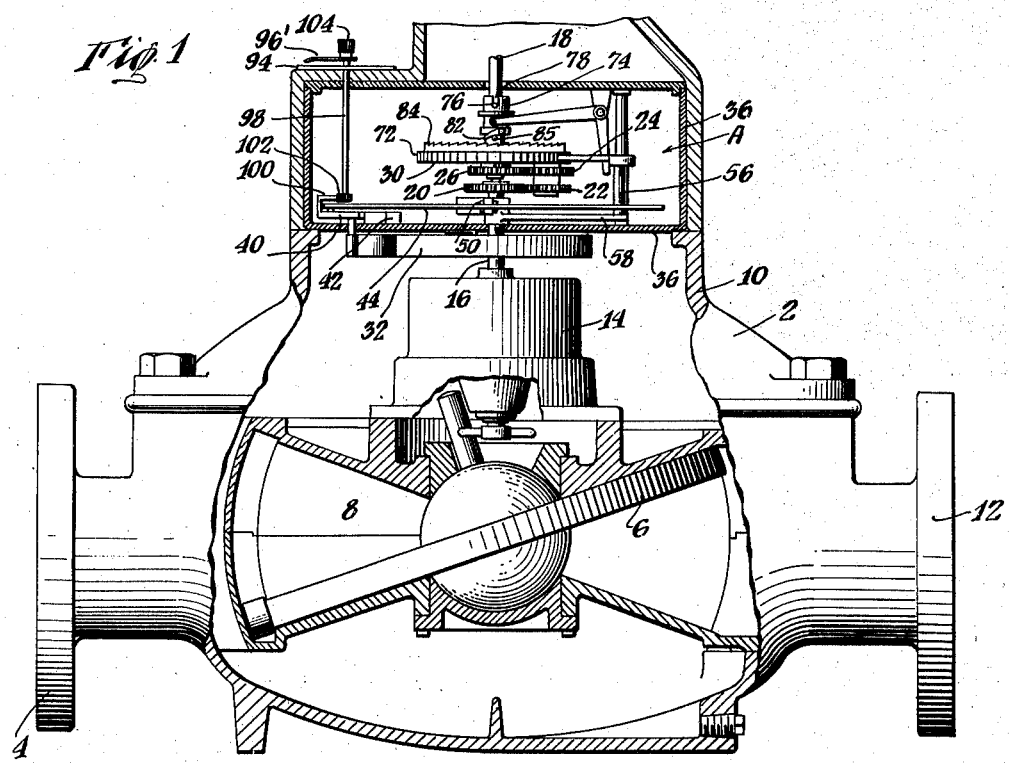
Figure 1 is a view of a measuring device partly broken away to disclose a typical embodiment of a temperature compensating transmission.
Figure 4:
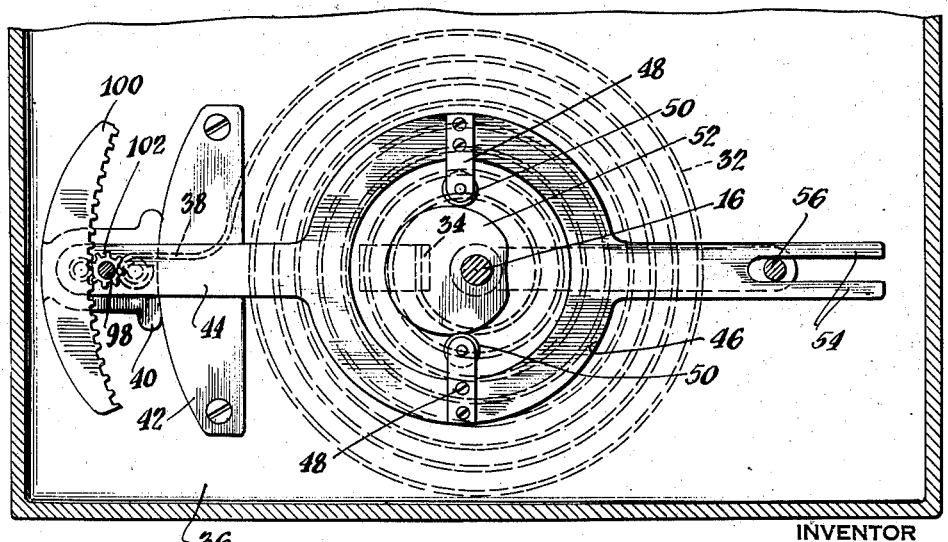
Figure 4 is a view in section taken on line 4—4 of Figure 2.

As illustrated in the drawings, a typical form of the temperature compensating register transmission may be used in conjunction with a nutating disc type of meter 2 of known form, although any other type of meter such as a rotating or oscillating piston type of meter may readily be used. In the type of meter disclosed, the liquid passes through an inlet port 4 and causes nutation of the piston 6 in the known manner, passing from the piston chamber 8 through the meter casing 10 and out of an outlet port 12. The nutation of the piston 6 is transmitted by means of a gear reduction system 14 to a shaft 16 which normally is directly connected to a register (not shown) of any desired type for operation of the same in accordance with the quantity of liquid passing through the meter.

The temperature compensating device A of the present invention may suitably be situated in the meter casing 10 between the reduction gear shaft 16 and a shaft 18 connected to the register. The device A may consist of a transmission the speed of which is varied by changes in temperature in proportion to the increases or decreases in volume resulting from the changes in temperature of the liquid.

The reduction gear shaft 16 carries at its outer end a gear 20 meshing with a pinion 22 integral with or fixed to a second pinion 24, the latter meshing with a gear 26 fixed to and rotating the register shaft 18. The pinions 22 and 24 are rotatably mounted on a pin 28 eccentrically positioned on a large ratchet member 30 rotatably mounted on the register shaft 18.

The reduction gear shaft 16 normally tends to drive directly the register shaft 18, so that they rotate at the same speed when no restraint is placed upon the large ratchet member 30.

The reduction shaft gear 20 preferably has a greater number of teeth than the pinion 22 and the pinion 24 has the same number of teeth as the register shaft gear 26. Therefore, if the ratchet member 30 is restrained against movement, rotation of the reduction gear shaft 16 will drive through gears and pinions 20, 22, 24 and 26 and cause increased rotational speed of the register shaft 18.

The ratio of gears and pinions 20, 22, 24 and 26 preferably produces an approximate 10% increase in the speed of rotation of the register shaft 18 over the reduction gear shaft 16. The purpose of this increase of relative rate of speed is to compensate for increases and decreases in volume of the liquid.

In measuring, for example, petroleum products, it has been found that a 15° F. increase in temperature produces approximately 1% increase in volume of the liquid. Therefore, in providing a 10% differential in the speed of rotation of the register shaft, the temperature compensator A is capable of handling a range of temperatures of about 150° F., which is in excess of the normal variation in temperatures in most locations.

The planetary gear system acts as a variable two speed transmission, the two speeds having ratios of 1 to 1 and 1 to 1.1 approximately. By alternately using the two speeds in a desired ratio, any average speed between 1 to 1 and 1 to 1.1 can be produced. The average speed may be obtained by intermittently imposing a temporary restraint on the ratchet member 30.

The transmission may be controlled by any suitable temperature-responsive means such as a Sylphon bellows but in the embodiment illustrated in Figures 1 to 5 of the drawings a bimetallic thermostat 32 is used. The thermostat 32 is fixedly mounted at one end on a bracket 34 attached externally of the housing 36 of the temperature compensator A and disposed within the meter casing 10, in contact with liquid passing therethrough. The free end 38 of the thermostat is pivotally connected to an arcuate sliding member 40 bearing against an arcuate plate 42 mounted in the lower portion of the housing 36 at a point close to their contacting surfaces.

Pivotally supported at the outer end of the arcuate slide 40 is a lever 44 having an annular portion 46 provided with inwardly projecting brackets 48 carrying rollers 50 which engage a heart-shaped cam 52 fixed to the reduction gear shaft 16, whereby rotation of the reduction gear shaft 16 will cause oscillation of the pivoted lever 44 through an arc of fixed length.

While the thermostat 32 can move the arcuate slide 40 along guide 42, due to the point of connection of the thermostat being close to their engaging surfaces, the lever 44 cannot move the slide 40. The point of pivotal connection of lever 44 being spaced from the arcuate surface, movement of lever 44 tends to rock the slide 40 about the thermostat pivot, thereby wedging it against the guide 42.

Because of expansion and contraction of the thermostatic element 32, the arcuate slide 40 will be moved back and forth across the arcuate guide 42, changing the center of pivotal movement of the arm 44 and thereby also varying the position of the arc produced by movement of the bifurcated ends 54 of the lever 44. Movement of the lever 44 is utilized to oscillate a pin 56 carried by a lever 58 movably mounted on the reduction gear shaft 16. The outer end of the pin 56 engages the cam surface 60 of a pawl member 62 pivotally mounted in the casing 36 and normally urged toward the ratchet member 30 by a spring 64. The cam surface 60 consists of two substantially parallel portions 66 and 68 connected by inclined surface 70 and is so arranged that upon movement of the pin 56 in a clockwise direction as viewed in Figure 3, the pawl 62 is displaced out of engagement with the ratchet 72 on ratchet member 30 when the pin strikes the inclined surface 70. Movement of the pin 56 in a counterclockwise direction will allow the pawl 62 to engage the ratchet 72 when the pin 56 rides off the inclined surface 70. Thus for every revolution of reduction gear shaft 16, the pawl 62 will be subjected to an oscillating impulse between its ratchet engaging and displaced position.

The length of time of contact of the pawl 62 with the ratchet 72 is determined by the length of time pin 56 is disengaged from portions 70 and 68 and therefore by the position of the arcuate slide 40. As the thermostat 32 expands due to increases in temperature, the arcuate slide 40 is moved in a clockwise direction as viewed in Figure 4, thus also displacing the pin 56 in a clockwise direction, the link 58 maintaining the pin spaced at all times the same distance from the reduction gear shaft 16, thereby assuring contact of pin 56 with cam surface 70 at the same point on the arc.

When the bifurcated end 54 of the lever is oscillated by the cam 52, with the arcuate path of movement of the pin 56 displaced clockwise, pin 56 tends to retain the pawl 62 out of contact with the ratchet 72 over a greater portion of the arcuate path of movement and a greater period of time, and thus allows a longer period of a direct or low speed drive from the meter to the register.

When the arcuate element 40 is moved counterclockwise because of a decrease in temperature, the arcuate path of movement of the pin 56 is also moved counterclockwise and therefore the pawl 62 is retained out of contact with the ratchet a shorter length of time and consequently will allow a longer period of higher speed drive of the register. Thus the arrangement is such that the planetary gearing system operates intermittently at different speeds and the relative rates of rotation of the reduction gear shaft 16 and the register driving shaft 18 are controlled within limits of 1 to 1 and 1 to 1.1 by the temperature of the liquid passing in contact with the thermostatic element 32.

The device may be provided with a pawl and ratchet clutch for more positively transmitting the direct rotation of the reduction gear shaft 16 to the register shaft 18, while the pawl 62 is out of engagement with the ratchet 70. While any suitable mechanism may be used, it may consist of a sleeve 74 rotatable with the register shaft 18, but movable longitudinally thereof as permitted by the key 76 and slot 78 in the register shaft 18 and collar 74, said collar carrying a transverse arm 80 keyed to, but longitudinally movable with respect to the collar 74. The arm 80 carries at opposite ends a pair of pawls 82 which are engageable with an annular ratchet 84 on top of the ratchet member 30. Pawls 82 are retained in a predetermined angular position by means of stops 85 on the arm 80. Movement of the pawl carrying arm 80 is controlled by a bellcrank lever 86 having one arm 88 engaging pawl 62 and having a bifurcated opposite end 90 provided with rollers 92 engaging between a flange 94 on the sliding sleeve 74 and the top of the pawl arm 80. The pawls 82 and 62 are so arranged that when the thermostatically controlled pawl 62 releases the ratchet member 30, the pawls 82 on the arm 80 will engage the annular ratchet 84, thereby locking ratchet member 30 to shaft 18. To allow for different distances of movement of the bellcrank lever arm 90, a leaf spring 96 may be mounted on the sleeve 74 normally urging the arm 80 upwardly.

The temperature compensating device is so arranged with respect to the meter and the register that the direct drive, that is, the 1 to 1 drive, will be constantly operative at the highest temperature attained by liquid to be measured. For example, if the highest temperature attained by a liquid to be measured is 130° F., the thermostatic element 32 should be so expanded at that temperature and the arc of movement of the pin 56 so moved in a clockwise direction, that it will never ride off the surface 68 and inclined surface 70 of cam 60, thereby preventing the pawl 62 from contacting the ratchet 72. Having a temperature responsive range of approximately 150° F., at a temperature of −20° F., the thermostatic element 32 will be so contracted and the arc of movement of the pin 56 so moved counterclockwise, that the pin 56 will never move off the surface 66 of the cam 60, and therefore, will never move the pawl 62 out of contact with the ratchet 72, thus driving continuously at a 1 to 1.1 ratio.

If it is desired to measure liquid volumes and indicate the volume at a predetermined temperature such as for example 60° F., the reduction gear system 14 will be so arranged that on passage of liquid at 60° F. temperature through the meter, the indication on the register will be an exact indication of the volume passing therethrough. When so arranged, if the temperature of the liquid is above 60° F., the length of time of engagement of the pawl 62 with the ratchet 72, and of free movement of the ratchet member 30 will be so proportioned that the volume indication on the register will be less than the actual volume of the liquid passing through the meter by an amount equal to the increase in volume of the liquid occasioned by the increase in temperature above 60° F.

The device may be additionally provided with a visible temperature indicator and manual control, if so desired. Such an indicator and/or control is of considerable advantage in informing the attendant of the operation of the device, and allowing manual temperature control if anything should disable the thermostat or if the thermostat is eliminated from the transmission.

The temperature indicator may suitably consist of a dial 94 calibrated to the desired temperature range, mounted on the meter casing 10 as shown in Figure 1 or at a point spaced therefrom. A pointer 96' mounted on a shaft 98, travels over the dial and is actuated by the thermostat 32 through an arcuate rack 100 concentric with shaft 16, carried by the slide 40 substantially in alignment with pivot point of lever 44, and a pinion 102 fixed to shaft 98. It will be understood, of course, that the pinion 102 is of such size as to move the pointer 96' around the dial 94 as the slide 40 is displaced by the thermostat 32 to indicate the temperature of the liquid.

The shaft 98 may be provided wtih a knurled knob 104, through which the pointer 96' may be moved to a determined temperature and the slide 40 displaced to the position corresponding to this temperature for manually adjusting the transmission to the temperature of the liquid.

A modified form of device embodying the invention operating on the principles outlined above may include a Sylphon bellows, as a temperature responsive device. The Sylphon bellows may readily replace the bimetallic thermostat, the only other change required being the provision of a lever for increasing movement of the slide 40 with relation to the expansion or contraction of the bellows. However, as shown, the Sylphon bellows may also be connected by a conduit to a reservoir containing the same fluid as that which fills the bellows. The reservoir may be located at any place in the l'quid circuit either within the meter or in the conduits leading to or from the meter, rendering the transmission responsive to the temperature of the liquid at any place in the circuit.

Figure 6:
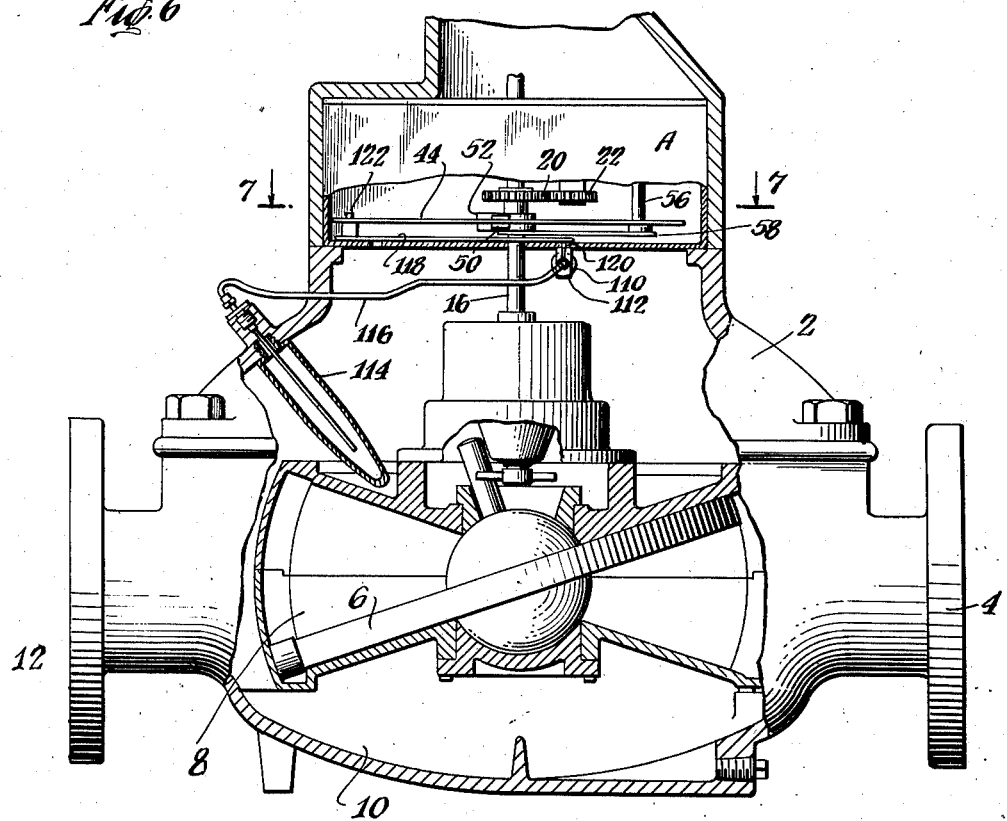
Figure 6 is a side view of a measuring device partly broken away to disclose a modified form of temperature compensating transmission.
Figure 7:
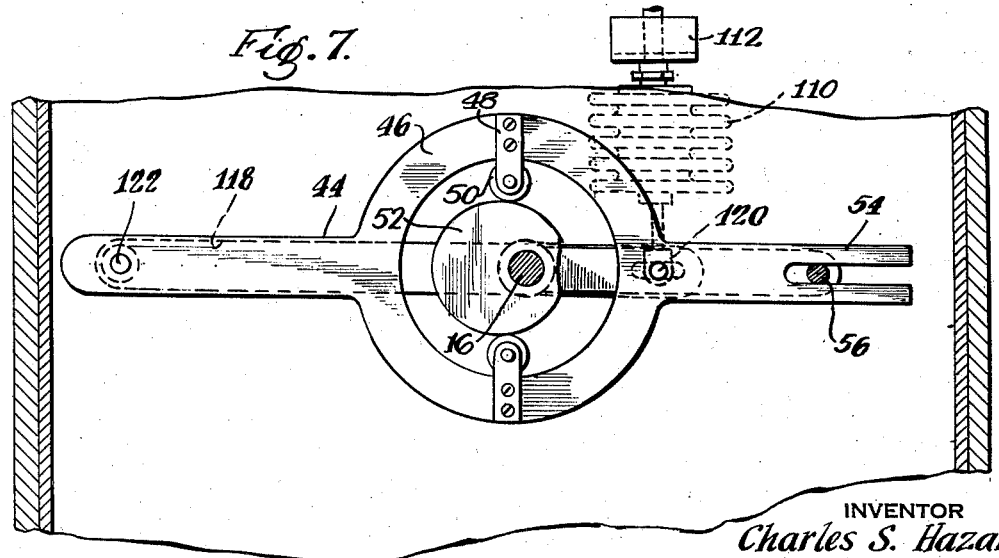
Figure 7 is a view in section, taken on line 7—7 of Figure 6, also partly broken away.

A typical form of this type of device is disclosed in Figures 6 and 7 of the drawings.

The meter 2 and the variable speed transmission A may be substantially the same as in the previously described form of device.

A Sylphon bellows 110 may be disposed in and fixed to a bracket 112 in the meter casing 2 so that the liquid passing through the casing 2 will maintain the temperature of the fluid in the bellows 110 the same as the temperature of the fluid in the reservoir.

Expansion and contraction of the bellows 110 is controlled by means of liquid in a reservoir 114, disposed at any place in the liquid circuit where the temperature of the liquid will be the same as in the meter casing 2, or, as disclosed in the drawings, in the meter casing 2. The reservoir 114 is preferably of considerably greater capacity than the Sylphon bellows 110 and is preferably constructed of rigid highly conductive metal. The reservoir 114 may be connected by a conduit 116 with the Sylphon bellows 110 so that expansion or contraction of the liquid in the former controls the change in length of the bellows 110 despite possible variations in temperature of the liquid simultaneously surrounding the reservoir 114 and bellows 110. The change in size of the bellows 110 is utilized through a lever 118 mounted on gear reduction shaft 16 to shift the pivot point of lever 44. One end of lever 118 is connected through a sliding pivot 120 to the free end of bellows 110 and the other end through a fixed pivot 122 to lever 44. The portion of lever 118 carrying pivot 122 is preferably of greater length than the other end whereby the rather limited change in length of the Sylphon bellows 110 produces a relatively great movement of the pivot 122 about which lever 44 is oscillated by cam 52.

The Sylphon bellows 110 thus produces the same action on the variable speed transmission A as does the bimetallic thermostat 32.

While I have described typical embodiments of the invention utilizing the same and increased rates of speed of the register shaft and the reduction gear shaft, it will be understood that the ratios may be changed to obtain any desired relative rotational speeds.

It will be further understood that the ratios of the gears in the planetary gear system may be varied so as to compensate for greater or lesser variations in temperature, all of such modifications falling within the intended scope of the invention as defined in the following claims.

I claim:

1. In a liquid measuring device, the combination of a meter, a register and means operatively connecting said meter and said register for automatically causing the latter to indicate liquid volumes at a predetermined temperature, comprising a shaft actuated in response to operation of said meter, a shaft connected to said register, planetary gearing connecting said shafts, said gearing allowing a direct drive between said shafts when unrestrained, and varying the relative speeds of rotation of said shafts when restrained, means actuated by the first mentioned shaft for intermittently restraining the planetary gearing and temperature responsive means controlling the restraining means to vary the intermittent restraint on the planetary gearing.

2. In a liquid measuring device, the combination of a meter, a register and means operatively connecting said meter and said register for automatically causing the latter to indicate liquid volumes at a predetermined temperature, comprising a shaft actuated in response to operation of said meter, a shaft for driving said register, planetary gearing connecting said shafts, said gearing allowing a direct drive between said shafts when unrestrained and varying the relative speeds of said shafts when restrained, a ratchet connected to said planetary gearing, a pawl actuated by said meter actuated shaft for intermittently engaging said ratchet to restrain said planetary gearing and temperature responsive means regulating the interval of engagement of the pawl with said ratchet.

3. In a liquid measuring device, the combination of a meter, a register and means operatively connecting said meter and said register for automatically causing the latter to indicate liquid volumes at a predetermined temperature, comprising a shaft driven in response to operation of said meter, a shaft for driving said register, planetary gearing connecting said shafts, said gearing allowing a direct drive between said shafts when unrestrained, and varying the relative speeds of said shafts when restrained, a ratchet connected to said planetary gearing, a cam on said meter-driven shaft, means including a pawl engageable with and oscillated by said cam for intermittently engaging said ratchet to restrain said planetary gearing and temperature responsive means regulating the interval of engagement of said pawl with said ratchet.

4. In a liquid measuring device, the combination of a meter, a register and means operatively connecting said meter and said register for automatically causing the latter to indicate liquid volumes at a predetermined temperature, comprising a shaft driven in response to the operation of said meter, a shaft for driving said register, planetary gearing connecting said shafts allowing a direct drive between said shafts when unrestrained and varying the relative speeds of said shafts when restrained, a ratchet connected to said gearing, a pawl adjacent to and normally urged toward said ratchet, a cam on said pawl, a cam on said meter driven shaft, a pivoted lever moved by said shaft cam, means moved by said lever and engageable with said pawl cam to rock said pawl between positions spaced from and in engagement with said ratchet, and temperature actuated means for shifting the pivot of said lever to control the movement of said pawl.

5. In a liquid measuring device, the combination of a meter, a register and means operatively connecting said meter and said register for automatically causing the latter to indicate liquid volumes at a predetermined temperature comprising a two speed transmission, means actuated in response to operation of said meter for alternately changing the speeds of said transmission, and a Sylphon bellows controlling said speed changing means to produce an average rate of speed compensating said register for variations in liquid volume caused by temperatures differing from said predetermined temperature.

6. In a liquid measuring device, the combination of a meter, a register and means operatively connecting said meter and said register for automatically causing the latter to indicate liquid volumes at a predetermined temperature comprising a two speed transmission, means actuated in response to operation of said meter for alternately changing the speeds of said transmission, an expansible and contractible bellows controlling said speed changing means, a reservoir in contact with said liquid containing a fluid and means connecting said reservoir to said bellows for expanding and contracting the latter in proportion to variation in volume of the fluid in said reservoir to produce an average rate of speed compensating said register for variations in liquid volume caused by temperatures differing from said predetermined temperature.

7. In a liquid measuring device, the combination of a meter, a register and means operatively connecting said meter and said register for causing the latter to indicate liquid volumes at a predetermined temperature comprising a shaft actuated in response to operation of said meter, a shaft for driving said register, a variable speed transmission connecting said shafts, said transmission allowing a direct drive between said shafts when unrestrained and varying the relative speeds when restrained, cooperating means connected to said transmission and said meter actuated shaft for intermittently restraining said transmission and temperature responsive means for regulating the interval of restraining action to produce an average relative speed of said register and said meter actuated shaft which compensates for variations in liquid volume caused by temperatures differing from said predetermined temperature.

CHARLES S. HAZARD.